United States Patent [19]
Ross

[11] 3,902,258
[45] Sept. 2, 1975

[54] SHOCK ABSORBER DEMONSTRATION STAND

[75] Inventor: Matthew C. Ross, Chicago, Ill.

[73] Assignee: Ross & Woolf Associates Inc., Chicago, Ill.

[22] Filed: Dec. 23, 1974

[21] Appl. No.: 535,229

[52] U.S. Cl. .................................. 35/50; 73/11
[51] Int. Cl.² ................................. G09B 25/00
[58] Field of Search .............. 35/49, 50; 73/11, 71.7

[56] References Cited
UNITED STATES PATENTS

| | | | |
|---|---|---|---|
| 1,511,818 | 10/1924 | Moore | 73/71.7 |
| 3,164,003 | 1/1965 | MacMillan | 73/71.7 X |
| 3,187,554 | 6/1965 | Lackman | 73/11 |
| 3,444,629 | 5/1969 | Ward | 35/50 |
| 3,645,016 | 2/1972 | Wiegand | 35/50 |

Primary Examiner—Harland S. Skogquist
Attorney, Agent, or Firm—Rummler & Snow

[57] ABSTRACT

A portable device for demonstrating a shock absorber of the barrel type normally used in connection with automobiles employing a regular automobile tire rotatable by a rotatable rise and quick fall cam having one or more depressions therein for simulating bumps in a road. A vertically extending shock absorber is pivotally mounted between a pair of spaced, horizontally extending bars simulating mounting on automobile parts. Means are provided for rotating the cam. Upon rotation of the cam, the tire will not drop abruptly when it reaches the fall/bump of the cam, thus effectively illustrating the effective use of the shock absorber. When the tire reaches the fall/bump in the cam, it will act like hitting a bump in the road. By employing a pair of shock absorbers, one a new or good one and the other a used or bad one, and mounting them side-by-side on the frame or stand of this demonstration unit, it will visually demonstrate the value of good shock absorbers to the motoring public.

7 Claims, 17 Drawing Figures

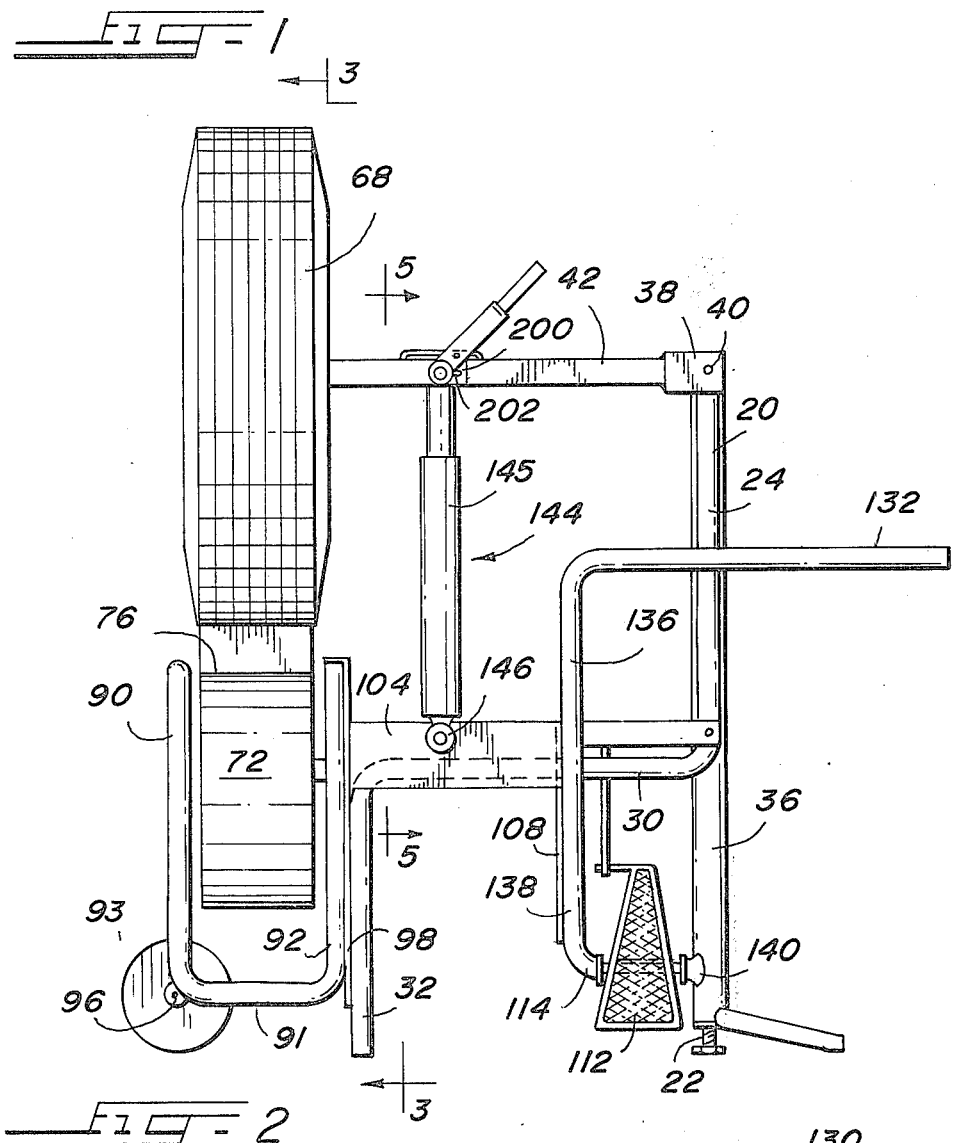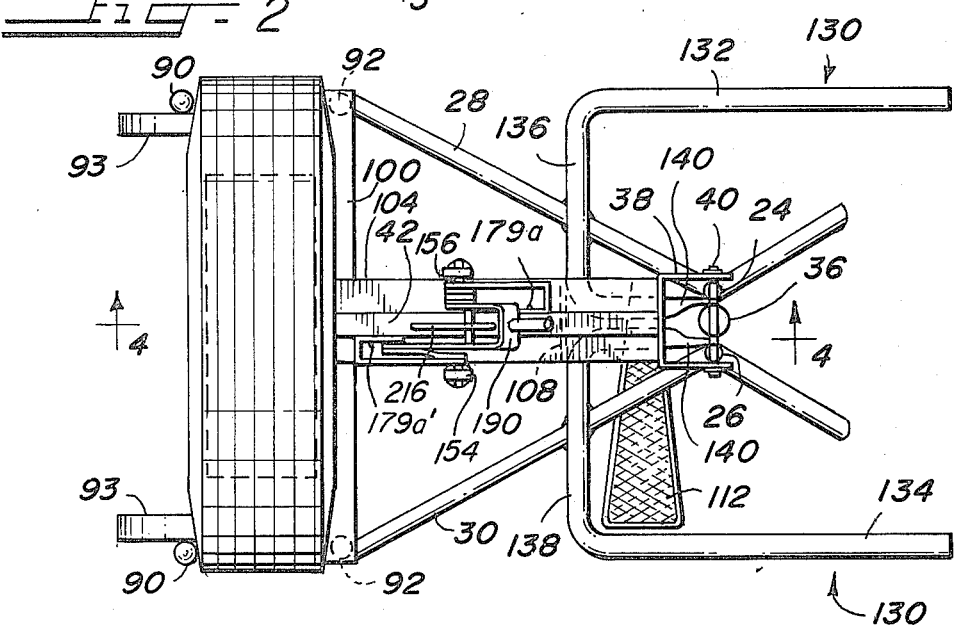

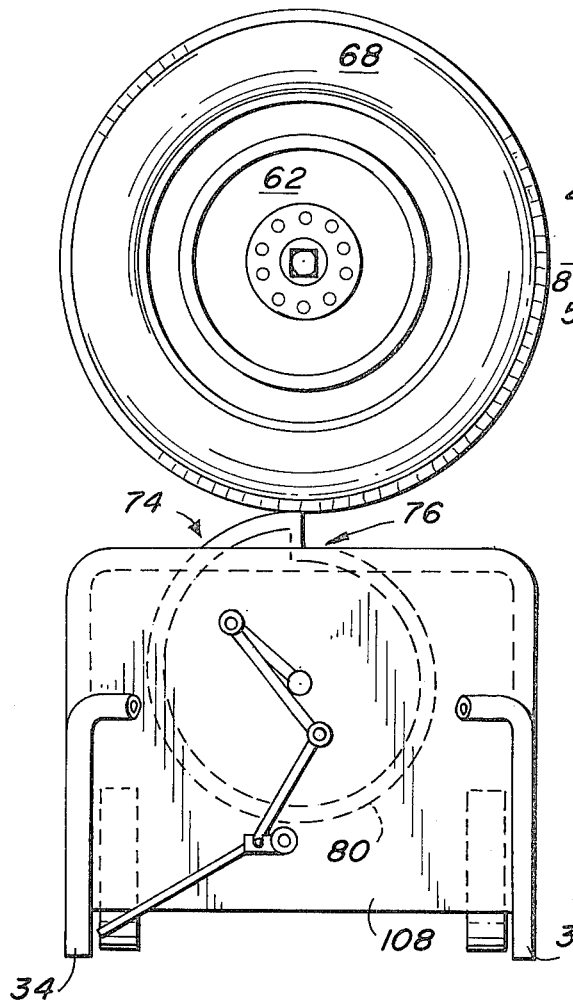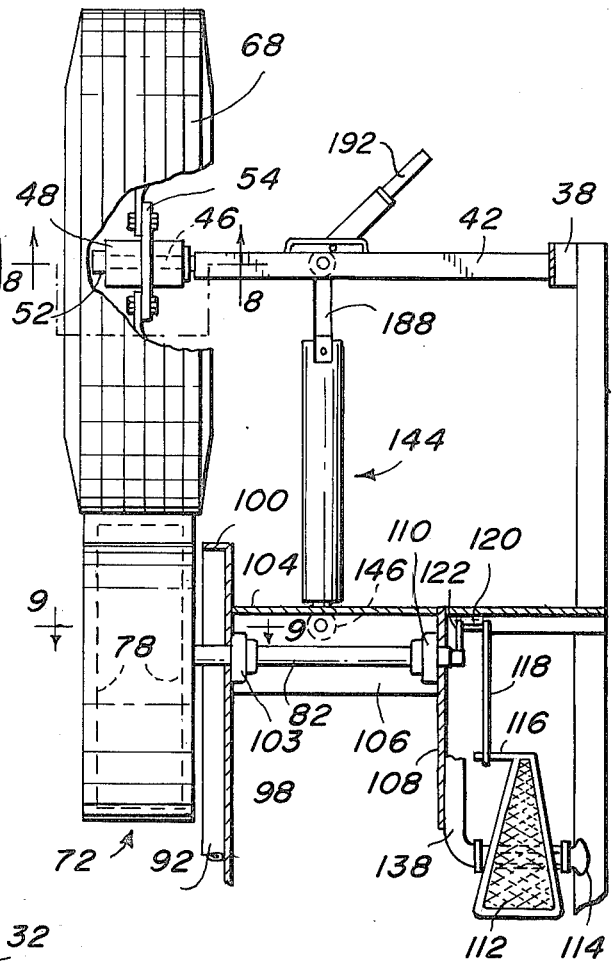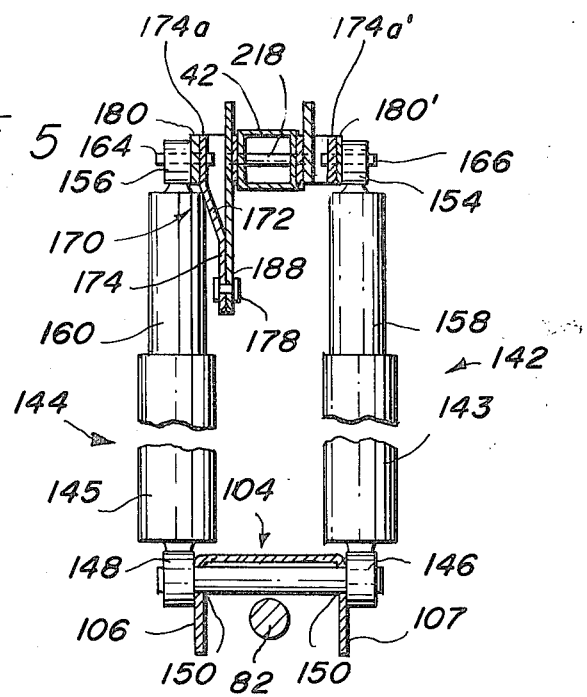

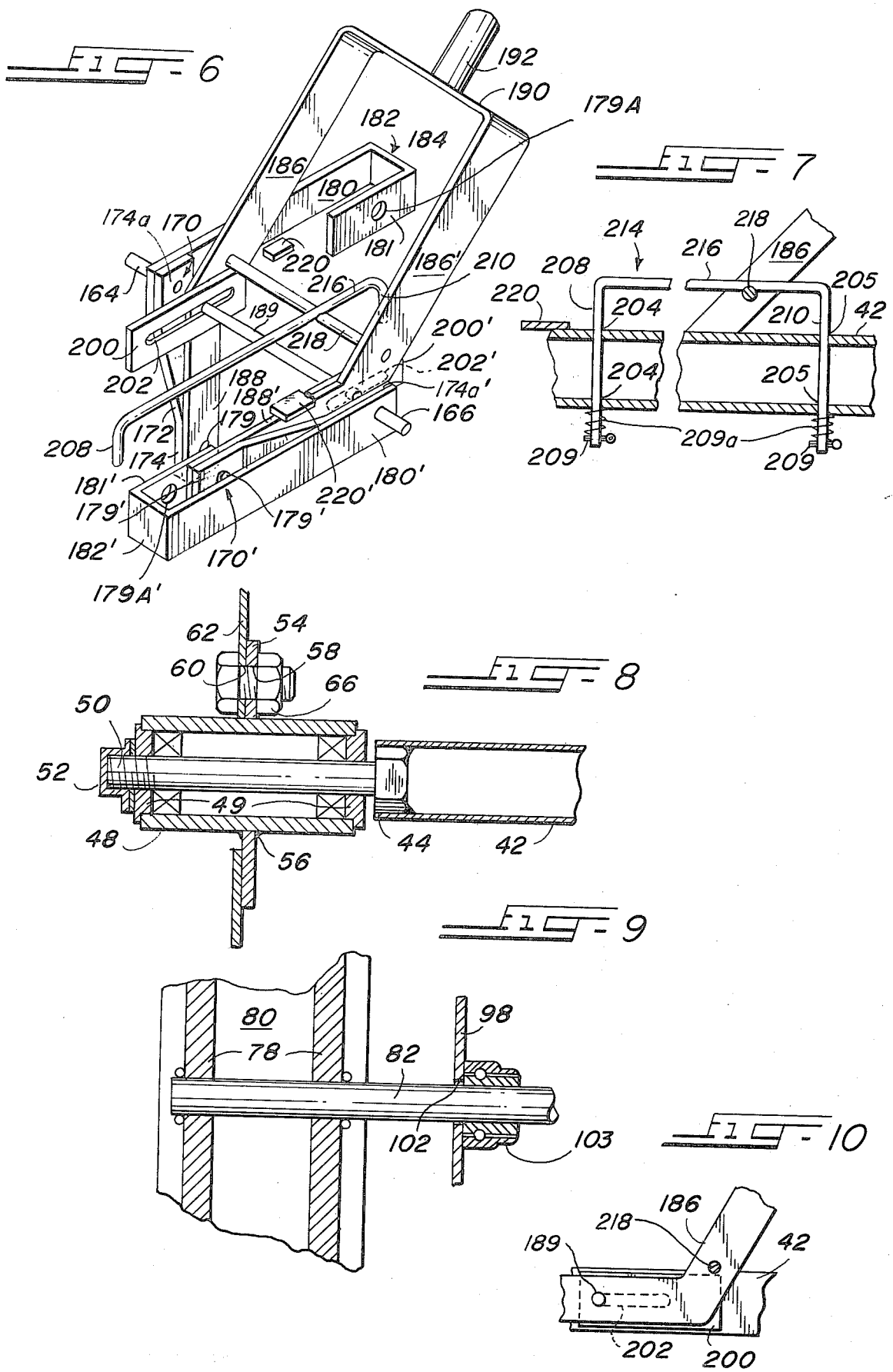

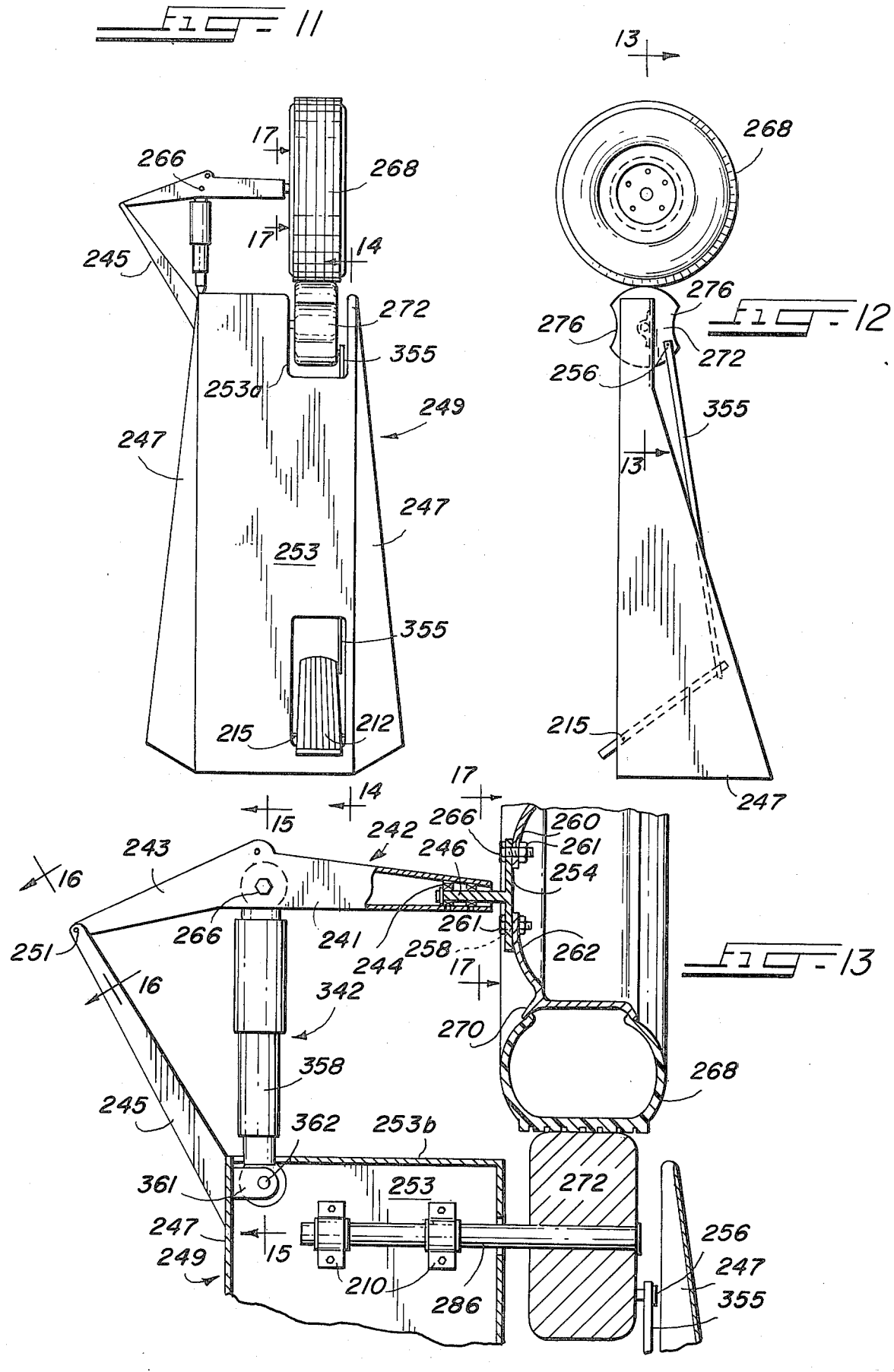

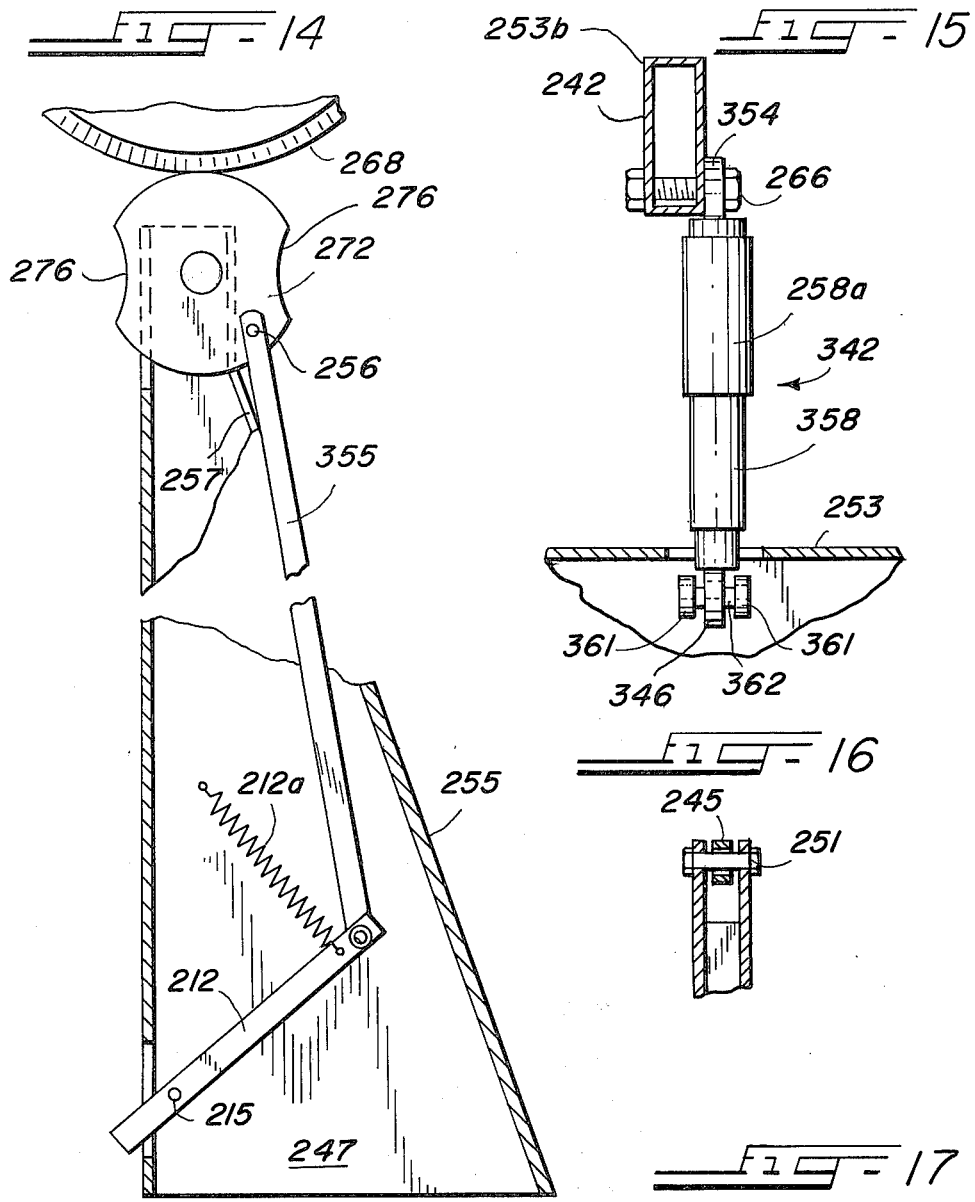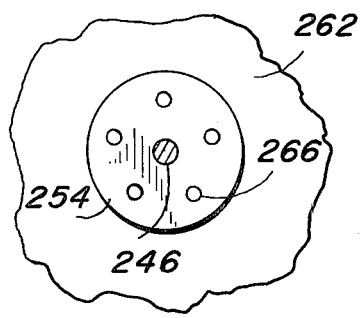

SHOCK ABSORBER DEMONSTRATION STAND

BACKGROUND OF THE INVENTION

U.S. Pat. Nos. 2,782,634 and 3,690,145 disclose shock absorber testing equipment while U.S. Pat. Nos. 3,478,445 and 3,715,814 are for demonstration stands for shock absorbers, but do not include or use an actual tire with the apparatus to demonstrate the actual effect on the shock absorbers when the tire hits a depression or obstruction in the road.

SUMMARY OF THE INVENTION

A portable shock absorber demonstrator for automobiles wherein an actual automobile tire is rotated by a rotary cam having a quick fall or bump in or on said cam to simulate a tire falling into a hole in a road or hitting an obstruction in the road. The tire is provided with a horizontally disposed simulated axle, while the other end of the simulated axle is pivotally secured to a post. A vertically extending shock absorber is pivotally mounted adjacent the tire on one side of the simulated axle and at the other end to one side of a stationary platform. Means are provided to rotate the cam in either direction whereby the tire bearing against the face of the cam will cause the tire to drop at the quick fall in the cam or hit an obstruction on the cam as it rotates simulating the tire reaching a depression, hole or bump in the road, and actuating the shock absorber to illustrate its action as the simulated axle is held against being shifted downwardly or angularly about its pivot. Also, this device discloses two side-by-side shock absorbers, one in new or good condition and one in old or bad condition, and means to illustrate the operative or inoperative effect of shock absorbers.

BRIEF DESCRIPTION OF THE DRAWINGS

FIG. 1 is a side elevational view of the device of the present invention;

FIG. 2 is a top elevational view of the device of FIG. 1;

FIG. 3 is a side view taken along the lines 3—3 of FIG. 1 with parts in section and parts in dash lines;

FIG. 4 is a partial sectional view taken along the lines 4—4 of FIG. 2 with parts broken away;

FIG. 5 is a partial cross-sectional view taken on the lines 5—5 of FIG. 1 showing double shock absorbers in position;

FIG. 6 is a perspective view of the mechanism to make effective either of the shock absorbers to illustrate the action of one or the other when the tire hits the cam fall with parts not shown for clarity;

FIG. 7 is an elevational view of the holddown guide bar with parts in cross section;

FIG. 8 is a cross-sectional view taken along the lines 8—8 of FIG. 4;

FIG. 9 is a cross-sectional view taken on the lines 9—9 of FIG. 4;

FIG. 10 is a partial elevational view;

FIG. 11 is a front elevational view of a modified form of the invention;

FIG. 12 is a side elevational view of the device of FIG. 11 taken from the left hand side thereof;

FIG. 13 is a partial cross-sectional view taken along the lines 13—13 of FIG. 12, with parts broken away and parts in elevation.

FIG. 14 is a vertical cross-sectional view taken along the lines 14—14 of FIG. 11;

FIG. 15 is a cross-sectional view taken along the lines 15—15 of FIG. 13;

FIG. 16 is a cross-sectional view taken along the lines 16—16 of FIG. 13; and

FIG. 17 is a front elevational view taken substantially along the lines 17—17 of FIG. 11.

DETAILED DESCRIPTION OF THE DRAWINGS

The supporting structure comprises a pair of legs 20 each having a vertical upper post 24, 26, horizontally and angularly disposed legs 28, 30 and vertical foot posts 32, 34. The third vertically disposed supporting post 36 is positioned between the upper posts 24, 26 and contains a leveler mechanism 22 welded or otherwise secured thereto. The post 36 extends to the floor. Thus full support for the device is had with legs 32, 34, 36.

A U-shaped clevis 38 is pivotally anchored to the upper ends of the legs 24, 26, 36 (see FIG. 2) by pivot pin 40. A square in cross section tube 42 is welded at one end to the clevis 38 and extends horizontally at right angles to the legs 24, 26, 36 and acts as a housing. The free end of tube 42 is provided interiorly with the head 44 of a bolt 46 (see FIG. 8), which head is welded interiorly of the housing 42. The shank of bolt 46a extends inwardly through the rotary tube support 48 which acts as an axle. The bolt 46 is threaded as at 50 to receive a threaded end cap washer combination 52. End plates 49 are welded one on each end of the housing 48 and contain aligned apertures for reception of the bolt 46 (see FIG. 8). A pair of nylon bushings are placed interiorly to assist in ready rotation of the housing 48.

A circular plate 54 is welded axially to the housing 48 as at 56 and extends latitudinally. The plate 54 is provided with circumferentially spaced apertures 58 which are aligned with the apertures 60 in the rim support plate 62 of a tire mount for the reception of bolts 66.

A tire 68 is mounted on the rim 70 which in turn is secured to plate 62 in the usual manner.

A cam 72 is positioned directly below and supports the tire on its relatively wide camming surface. This is accomplished because the tire is secured to the pivotal housing 42. Cam 72 is provided with a rise 74 and fast or abrupt fall 76, the purpose of which will hereinafter be described. The cam 72 is built up of a pair of spaced plates 78, the periphery of which is contoured as shown in FIG. 3. A tire bearing plate 80 is bent around and welded to the marginal edges of the plates 78 to form a camming surface. The edges of plate 80 extend laterally beyond the plates 78.

As shown in FIGS. 3 and 4, the cam 72 is mounted concentrically on an axle 82 and secured thereto by welding. The axle 82 extends laterally, as shown especially in FIG. 4.

The device is provided with a pair of spaced U-shaped tubes each having vertical legs 90, 92 and connector legs 91. Each leg 90 has a pin 96 to support wheels 93. It is noted that the lower portion of wheels 93 is positioned slightly above the lowermost end of legs or foot posts 32, 34 (see FIGS. 1 and 3).

A vertical plate 98 is welded to legs 92 and spans the area between them. The legs 32, 34 are also welded to the plate 98 where they abut against said plate. The plate 98 is provided with a right angled part 100 to seat on top of leg 92. The plate 98 is provided with an aperture 102 and a ball bearing and race 103, the race being secured to the plate 98 for reception of the axle 82 (see FIG. 4). An inverted U-shaped housing 104 is welded at one end to the plate 98 and houses the axle 82. It is also provided with depending legs 106, 107 (see FIG. 5).

The upper end of a rectangular shaped, vertically positioned plate 108 is welded to the other end of the inverted U-shaped plate 104. The other end of axle 82 is journaled in plate 108 by a ball bearing and race 110 wherein the race is anchored to the plate 108. The axle 82 extends outwardly beyond the plate 108, as shown in FIG. 4.

The mechanism for rotating the shaft or axle 82 and hence the cam roller 72 comprises a foot treadle 112, pivotally secured on the leg 114. The treadle 112 is provided with a laterally extending arm 116 and anchored at one end thereto and a link arm 118 is pivotally secured adjacent its free end. A short right angled link 120 is pivotally secured to the free end of link arm 118 and extends laterally thereof. A short crank arm 122 is pivotally secured at one end to the free end of the link arm 120. The free end of crank arm 122 is rigidly secured to the axle or shaft 82, as clearly shown in FIG. 4. Thus, by actuation of the treadle 112, the shaft 82 will be caused to rotate and hence the cam 72 and tire 68.

To assist in making the device portable for shifting in various locations, a pair of U-shaped rods 130 are secured to the device. The rods 130 each comprise spaced long portions 132, 134 forming handles, inwardly extending angular portions 136, 138 and short vertical portions 114 (only one being shown) each being flattened at its free end and welded to opposite sides of vertical post 36 adjacent the lower end thereof, as at 140. It is noted that where the portions 136, 138 contact arms 28, a weld is made. Also, the plate 108 spans the legs 136, 138 and is also welded thereto (see FIG. 2).

The lower ends of a pair of shock absorbers 142, 144 are provided with the usual circular eyes 146, 148 having the usual aperture therethrough. These eyes are fixedly secured to the lower end of the shock absorber housings 143, 145. The inverted U-shaped housing plate 104 is also provided with aligned apertures 150 in each of the legs 106, 107 so that a pin 152 may support the lower end of the shock absorbers thereon on each side of the legs 106, 107.

The upper ends of the shock absorbers 142, 144 are also provided with apertured eyes 154, 156 fixedly secured to the upper ends of the respective piston arms 158, 160. The hubs 154, 156 are secured to the long legs 180, 180' by pivot pins 166, 168, respectively.

As the operating pivotal parts on both sides of the housing 42 are identical for operation of the shock absorbers, only one will be described, but a "prime" will be used on the numerals for the pivoting mechanism on the lower side of FIG. 6 for clarity.

A U-shaped plate, horizontally disposed, comprises a long leg 180, a short leg 181 and a connector leg 182. The short leg 181 is pivotally anchored to the housing 42 by a pivot bolt, shown schematically at 179a, through aperture 179 to position this U-shaped plate in substantially horizontal alignment with the longitudinal axis of the housing 42.

The straight arms or legs 188, 188' are each pivotally secured at one end to long pin 189 and integrally secured at this end to the lower ends of the angular upwardly and rearwardly plates 186, 186'. The plates of arms 186, 186' are provided with integrally formed connector plate 190 to which is secured a handlebar plate 192.

The lower or free ends of arms 188 are pivotally secured to a plate 170 which comprises a straight top portion 174a which is pivotally connected to the upper end of leg 180 by a pin 164, as shown in FIG. 6. The lower end of plate 170 is also provided with a straight portion 174 and the two portions are integrally connected by an angular portion 172 so that the portion 174 extends inwardly in a vertical plane, as shown in FIG. 5.

The lower end of portion 174 is pivotally connected at 179 to plate 188 adjacent its lower end thereof, as shown in FIG. 5.

The tube 42 has a small plate 200 welded thereto on each outer side wall thereof and each is provided with a horizontally disposed slot 202 in which the ends of rod 218 are seated and shift therein. Obviously the side wall of the tube 42 has corresponding aligned slots as the rod 189 extends therethrough.

The top and bottom walls of tube 42 are provided with a pair of spaced apertures 204, 205 with the apertures in the top walls aligned with the apertures in the bottom walls, respectively, to receive the vertical legs 208, 210 of an inverted U-shaped rod 214. The legs 186, 186' of the handle have a rod 218 anchored to and between them and the horizontal portion 216 of the rod rides thereon. The legs 208, 210 extend below the lower wall of the tube 42 and the lowermost ends of each are provided with cotter pins 209 to prevent removal whereby the legs 208, 210 freely ride up and down. A pair of tension springs 209a are disposed between the lower wall of housing 42 and the cotter pins and each is positioned on the legs 204, 205 as shown in FIG. 7. This keeps the handle from shifting out of line.

A pair of small butt plates 220, 220' are each welded at one end on each side of the top wall of the tube 42 to act as a stop to prevent the legs or arms 188, 188' from shifting higher than the top wall of tube 42.

In operation, with the handle in the position as shown in FIGS. 1 and 6, the piston rod 160 of a good shock absorber 144 is held in alignment with plates 188 and 172 which are in vertical alignment and the shock absorber will dampen as it is in operative position. As the tire 68 is rotated by cam 72 and the cam reaches the fall 76 or a bump, the tire will not drop as the shock absorber dampens the shock just as it would in an automobile since the tube 42 in effect acts as the axle of an automobile and the inverted U-shaped member 104 acts as the frame of the automobile, or vice versa if the shock absorber is reversed.

Thus the bad shock absorber 142 will not be functional since the pivot pin 166 attached to arm 170' and arm 188' is in a horizontal position. The shock absorber is in an inoperative position since movement of the cam and tire will cause the piston arm 160 to merely shift upwardly and downwardly with no dampening action. The plates or arms 170', 188' will merely move about its pivots 179a' and 166 as each is in horizontal alignment and thus there is nothing anchoring piston rod 158.

To lock the shock absorber 142 in operative position and the shock absorber 144 in inoperative position, the handle lever 192 is shifted to the left, as shown in FIGS. 4 and 6. This will shift the long rod 189 in the slots 202, 202', raising the arms 188 and 170 to horizontal position, while the arms 188' and 170' will shift from the horizontal position as shown in FIG. 6 to a vertical position. Thus the bad shock absorber 142 will be in operative position while the shock absorber 144 will become inoperative since the pivot pin 164 will only move up and down about pivot 179a. Thus, when the tire 68 is rotated by the cam 72, the tire will drop in the fall 76, or if it hits a bump, the tire will rise the height of the bump and the housing 42 will pivot about the pivot 40. The piston rod 158 will merely shift up and down in the housing 143 with no dampening action to thoroughly illustrate visually the difference between a good or new shock absorber and an old or worn out one.

It should now be obvious that should only one shock absorber be desired to demonstrate the dampening or nondampening effect by the device of the present invention, this also could readily be done by utilizing one side of the device.

In the modification shown in FIGS. 11 to 17, the regular automobile tire 268 is provided with the usual tire rim 270 integrally formed on the circular plate 262 having the usual lug apertures 260 positioned in the plate circumferentially therein. Each aperture is provided with a threaded lug 266 having nut 261 bonded around each aperture 260.

An axle 246 is provided with a circular plate 254 welded on the end thereof axially and the plate is provided with circumferentially spaced apertures 258 therein aligned with the apertures 260 for the reception of lugs 266 whereby the tire and its appendages are anchored to plate 254.

The axle 246 is housed in a substantially square in cross section housing 242 by a pair of ball bearings and races 244. The races are spaced from each other and anchored to the inner walls of the housing 242, all as clearly seen in FIG. 13.

The housing 242 has a portion 241 which is provided with a relatively horizontal bottom wall and an angularly spaced top wall tapered toward the bearing end thereof while the top wall of the integral left hand portion 243 tapers downwardly and outwardly and is pivotally supported at its end by the upper end of a tapered support leg 245 (see FIG. 13). The lower edge of the leg 245 is welded to the side wall 247 of frame 249.

The frame 249 is tapered upwardly from the base and comprises side walls 247, a front wall 253 and a partial lower rear wall 255 and a partial rear wall 257.

A cam 272 having a width substantially equal to the tire tread is provided with a pair of opposed transverse depressions 276, and is mounted directly below the tire 268 whereby the tire rests thereon being supported by the pivotal housing 242 and axle 246. The cam is positioned in an opening 253a in the upper part of the front wall 253.

The cam 272 is provided with an axle 286, the right hand portion of which is rigidly secured to the cam axially. The free end of the axle is mounted in spaced bearings 210, which bearings are secured to the rear wall 257.

The cam is rotated by an elongated rod 355, the upper end of which is pivotally secured adjacent the periphery of the cam at 256 (see FIGS. 12, 13 and 14). The lower end of the rod 355 is pivotally secured to the forward end of foot treadle 212. The treadle 212 is pivotally secured to rod 215, the ends of which rod are secured to the side wall 247. To assist in returning the foot treadle to the position shown in FIG. 14, a spring 212a is secured to the forward end thereof with the other end of the spring secured to side wall 247.

By depressing the forward end of the foot treadle, the cam will rotate and hence the tire.

A shock absorber of the barrel type 342 is pivotally secured to the housing 242 by a bolt 266 which extends through the eye 354 of the housing 242 and the piston rod 358 through the upper end of the top wall 253b of housing 249, as shown in FIG. 15.

The piston rod 358 is pivotally secured to the trunion 361 by a pin 362 extending through a trunion 259 via its eye 346.

When the foot treadle 212 is operated, the rod 355 will rotate the cam 272 and hence the tire. As the cam is rotated, the tire will reach one of the depressions 276 and cause the tire to bounce. Due to the shock absorber, the tire will not bounce vociferously but the bouncing will be dampened, thus demonstrating the value of shock absorbers on automobiles and other equipment where shock absorbers are used.

Although but two specific embodiments of this invention are herein shown and described, it will be understood that details of the construction shown may be altered or omitted without departing from the spirit of the invention as defined by the following claims.

I claim:

1. An automobile shock absorber performance demonstrator device comprising:
   a. a first frame means;
   b. a pair of first and second spaced horizontally-extending housings, the first housing positioned above the second housing, and said first housing pivotally anchored at one end to said frame;
   c. a pair of first and second horizontally-disposed axles, one positioned in and extending laterally from each of said housings;
   d. an automobile tire having treads anchored axially to said first axle;
   e. a cam having a fall therein mounted axially to said second axle, said tire treads abutting the periphery of said cam;
   f. means for rotating said cam; and
   g. a shock absorber pivotally mounted on and between said first and second housings and having a piston rod and shock absorber housing.

2. The device according to claim 1 wherein a pair of spaced shock absorbers are mounted on and between said first and second housings;
   a. means on said first housing to lock at least one of said shock absorbers in operative condition and the other in inoperative condition;
   whereby, when said cam is rotated, the tire will be rotated thereby and as it reaches the fall, the operative shock absorber will be contracted the amount of the distance of the abrupt fall on the cam and the shock absorber will slowly and smoothly return to its original position at a substantially uniform rate and said second shock absorber being in unlocked condition, the connecting arms will bounce.

3. The device according to claim 2 wherein said means to lock at least one of said shock absorbers in operative position comprises a pair of first and second arms pivoted together at one end, the free ends of said arms having a laterally-extending short pin for supporting the upper end of said shock absorbers, whereby when said arms are in a vertical position, they will lock the shock absorber in operative position.

4. The device according to claim 3 wherein the first housing is provided with side walls, a pair of U-shaped plates each having a long leg and a short leg and said plate extending at right angles, the short legs of said plate pivotally secured one on each side wall of said first housing, and each long leg provided with short pins extending laterally and outwardly of the free ends thereof and said first and second arms pivotally secured one to each of said short pins.

5. The device of claim 4 wherein a short plate is secured to each of the side walls of the first housing having horizontally-disposed long slots therein, in which slots the ends of said long pin seat for movement within said seat.

6. The device according to claim 5 wherein the legs of an inverted U-shaped frame are integrally secured one to each of said second arms and extend upwardly and angularly from said second arm, said arms having a connector arm on which a handle is secured.

7. An automobile shock absorber performance demonstration device comprising:
 a. a frame;
 b. a horizontally-extending hollow tube extending laterally from and pivotally secured at one end to said frame and shiftable in an angular latitudinal plane;
  1. a rotary axle extending laterally from said arm;
  2. a rectangularly-shaped housing on said axle having a circular perforated plate rigidly anchored axially to said arm;
  3. an automobile wheel having a tire with tread surfaces, a rim and a mounting plate positioned axially in and integrally secured to said rim;
 c. a cam having at least one rise and fast fall on its camming surface with the tread surface of said tire bearing thereon;
 d. a second axle extending horizontally and in spaced parallel relationship with said arm, one end of said second axle having said cam integrally secured thereto axially;
 e. means on said frame for rotating said second axle;
 f. a housing on said frame surrounding said second axle;
 g. a shock absorber pivotally secured at one end to said housing and at the other end pivotally secured to said arm;

whereby, when said cam is rotated, the tire will be rotated thereby and as it reaches the bump, the tire will be damped and the shock absorber will be extended the amount of the vertical distance of the bump on the cam and the shock absorber will slowly and smoothly contract to its original position at a substantially uniform rate.

* * * * *